United States Patent

Hung

(10) Patent No.: US 8,660,314 B2
(45) Date of Patent: Feb. 25, 2014

(54) MOTION-CONTROLLED DEVICE AND METHOD THEREOF

(75) Inventor: Kuo-Shu Hung, Tu-Cheng (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 234 days.

(21) Appl. No.: 13/078,847

(22) Filed: Apr. 1, 2011

(65) Prior Publication Data

US 2012/0213415 A1  Aug. 23, 2012

(30) Foreign Application Priority Data

Feb. 22, 2011 (CN) .......................... 2011 1 0043396

(51) Int. Cl.
*G06K 9/00* (2006.01)
(52) U.S. Cl.
USPC ........................................................ 382/107
(58) Field of Classification Search
USPC ........................................................ 382/107
See application file for complete search history.

(56) References Cited

U.S. PATENT DOCUMENTS

| 5,063,524 | A  | * | 11/1991 | Ferre et al. ...................... 382/107 |
| 5,731,832 | A  | * | 3/1998  | Ng .................................. 348/155 |
| 2004/0243419 | A1 | | 12/2004 | Wang |
| 2010/0159981 | A1 | | 6/2010 | Chiang et al. |

FOREIGN PATENT DOCUMENTS

TW          200513884 A    4/2005

* cited by examiner

Primary Examiner — Tom Y Lu
(74) Attorney, Agent, or Firm — Altis Law Group, Inc.

(57) ABSTRACT

An electronic device obtains a motion of a displaced object in two captured video frames utilizing phase correlation of the two frames. The device identifies magnitude of the motion and an area in a phase correlation surface corresponding to an area of the object, and accordingly determines if the motion is a qualified motion operable to trigger a gesture command of the device. The phase correlation surface is obtained from the phase correlation of the two frames.

13 Claims, 7 Drawing Sheets

MOTION-CONTROLLED DEVICE AND METHOD THEREOF

BACKGROUND

1. Technical Field

The disclosure relates to device control, and more particularly to motion-controlled device and method thereof.

2. Description of Related Art

Remote controls are commonly used to control a variety of devices, such as televisions (TV), and disc players. Game consoles, previously controlled only by hardwired controllers, have adopted motion-control capability, with rapid growth of demand for such intuitive user interfaces promoting evolution of various emerging controller-free technologies. Many of these, however, require deployment of peripherals such as a camera, infrared laser projector, a depth sensor, voice recognition device, or other, which not only increases costs but are impractical for mobile use.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Description of exemplary embodiments of a motion-controlled device and method thereof is given in the following paragraphs The disclosed electronic device 100 can be implemented as a standalone device or integrated in various electronic devices, such as a set-top box, a cell phone, a tablet personal computer (PC), a laptop computer, a monitor, a multimedia player, a digital camera, a personal digital assistant (PDA), a navigation device or a mobile internet device (MID).

Figure 1:
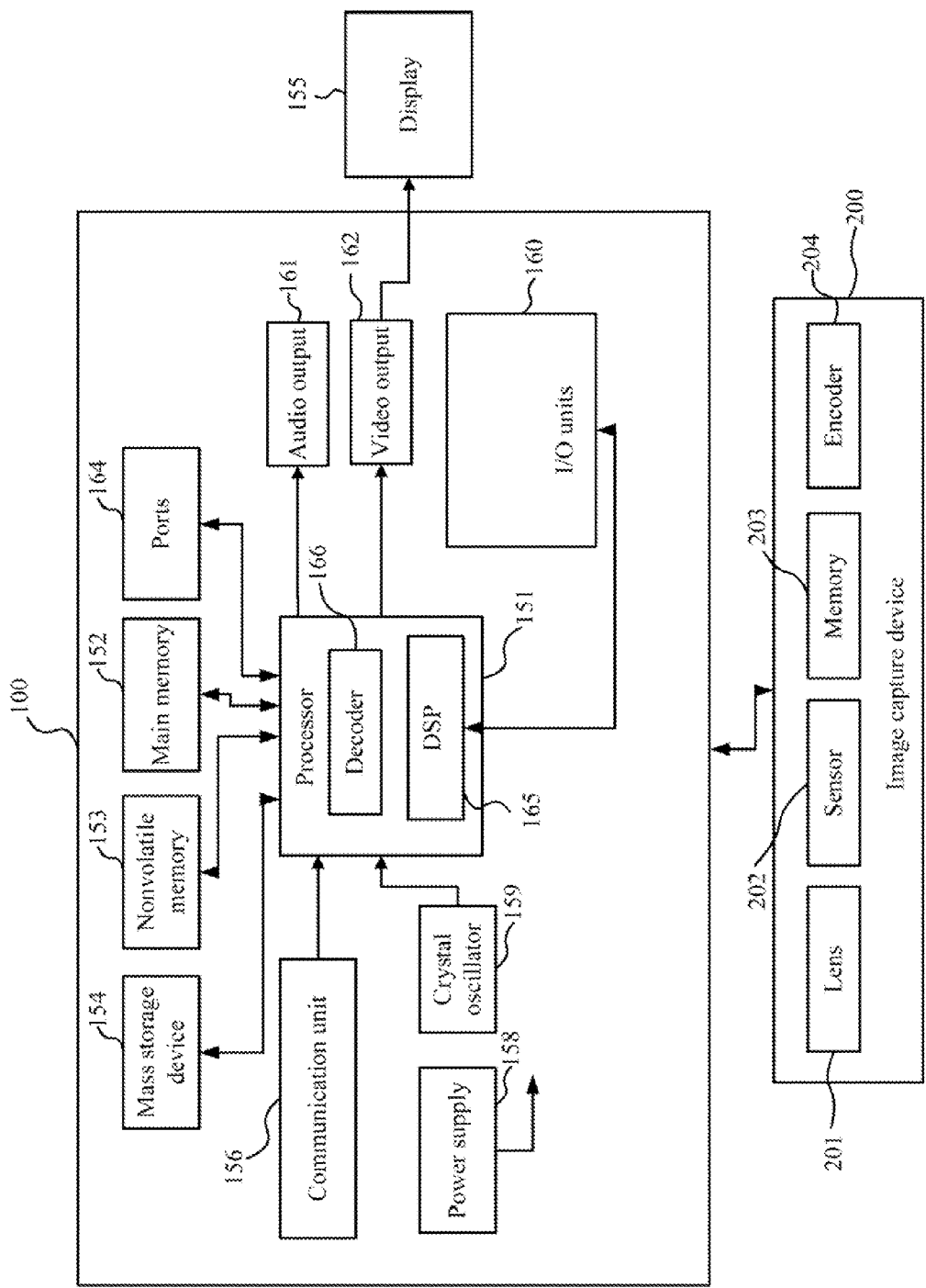
FIG. 1 is a block diagram of an exemplary embodiment of a motion-controlled electronic device.

With reference to FIG. 1, a processor 151 comprises a central processing unit (CPU) of the electronic device 100. The processor 151 may comprise various integrated circuits (ICs) for processing data and machine-readable instructions. Connection of the components in the device 100 is shown in FIG. 1 and may comprise serial or parallel transmission buses, or wireless communication channels. A communication unit 156 establishes communication channels through which the device 100 may connect to and download media data streams from a remote station. Additionally, the communication unit 156 may establish wireless communication channels through which a portable device, such as a remote control, may connect to and exchange data with the device 100. The communication unit 156 may comprise antennas, base band, and radio frequency (RF) chipsets for wireless local area network (LAN) communication and/or cellular communication such as wideband code division multiple access (W-CDMA) and high speed downlink packet access (HSDPA). Alternatively, through the established wireless communication channels, the device 100 may serve as a wireless LAN access point through which the portable device connects to the Internet.

The processor 151 may be packaged as a chip or comprise a plurality of chips interconnected through buses. For example, the processor 151 may only comprise a central processing unit (CPU) or a combination of a CPU, a digital signal processor (DSP), and a communication controller chip, such as a chip of the communication unit 156. In some embodiments of the motion-controlled device, the communication unit 156 may comprise one or more controllers of wired or wireless communication, such as for cellular, infrared, BLUETOOTH™, or wireless local area network (LAN) communication. The communication unit 156 coordinates communication among components of the device 100 or communication between the device 100 and external devices. A DSP 165 processes image data. A decoder 166 decodes the electrical signals of the image data according to a video coding standard, such as H.264, VC-1, MPEG-2, or MPEG-4. The DSP 165 and decoder 166 may comprise Integrated Circuits (ICs). Alternatively, the decoder 166 may comprise computerized code in the form of one or more programs that are stored in the memory 153. The computerized code includes instructions that are executed by the at least one processor 151 to provide functions for the decoder 166.

A power supply 158 provides electrical power to components of the device 100. A crystal oscillator 159 provides clock signals to the processor 151 and other components of the device 100. Input and output (I/O) units 160 may comprise control buttons and a plurality of light emitting diodes (LEDs). The processor 151 detects and controls operations on the I/O units 160. Ports 164 may be used to connect to various computerized interfaces, such as an external computer, or a peripheral device. The ports 164 may comprise physical ports complying with universal serial bus (USB) and IEEE 1394 standards, recommended standard 232 (RS-232) and/or recommended standard 11 (RS-11) defined by Electronics Industries Association (EIA), serial ATA (SATA), and/or high-definition multimedia interface (HDMI).

Nonvolatile memory 153 stores an operating system and applications executable by the processor 151. The processor 151 may load runtime processes and data from the nonvolatile memory 153 to the main memory 152 and store digital content in a mass storage device 154. The device 100 may obtain digital content such as media streams through the communication unit 156. The main memory 152 may comprise a random access memory (RAM), such as static RAM (SRAM) or dynamic RAM (DRAM). The nonvolatile memory 153 may comprise an electrically erasable programmable read-only memory (EEPROM) or a flash memory, such as a NOR flash or a NAND flash.

The device 100 may obtain digital content from broadcast signals through an antenna, a tuner, and a demodulator. Alternatively, the device 100 may obtain digital content from an information network, such as the Internet, through a network interface.

A video output unit 162 comprises filters and amplifiers for filtering and amplifying video signals output by the processor 151. An audio output unit 161 comprises a digital to analog converter converting audio signals output by the processor 151 from digital format to analog format.

A display 155 is operable to display text and images, and may comprise e-paper, organic light emitting diodes (OLED), a field emission display (FED), or a liquid crystal display (LCD). Alternatively, the display 155 may comprise a reflective display, such as an electrophoretic display, an electrofluidic display, or a display using interferometric modulation. The display 155 may display various graphical user interfaces (GUIs) as virtual controls including but not limited to windows, scroll bars, icons, and clipboards. The display 155 may comprise a single display or a plurality of displays in different sizes. The processor 151 may present various GUIs on the display 155 as detailed in the following paragraphs.

An image capture device 200 may be a device integrated in or connected to the electronic device 100 through the port 164. The image capture device 200 may comprise lens 201, an image sensor 202, a memory 203, and an encoder 204. The image sensor 202 converts an optical image received from the lens 201 into electric signals, and may comprise charge-coupled devices (CCDs) or a complementary metal-oxide-semiconductor (CMOS) active pixel sensors. The image sensor 202 may store the electric signals of the optical image in the memory 203. The encoder 204 encodes the electric signals of the optical image according to a video coding standard, such as H.264, VC-1, MPEG-2, or MPEG-4. The encoder 204 may comprise IC.

Figure 2A:
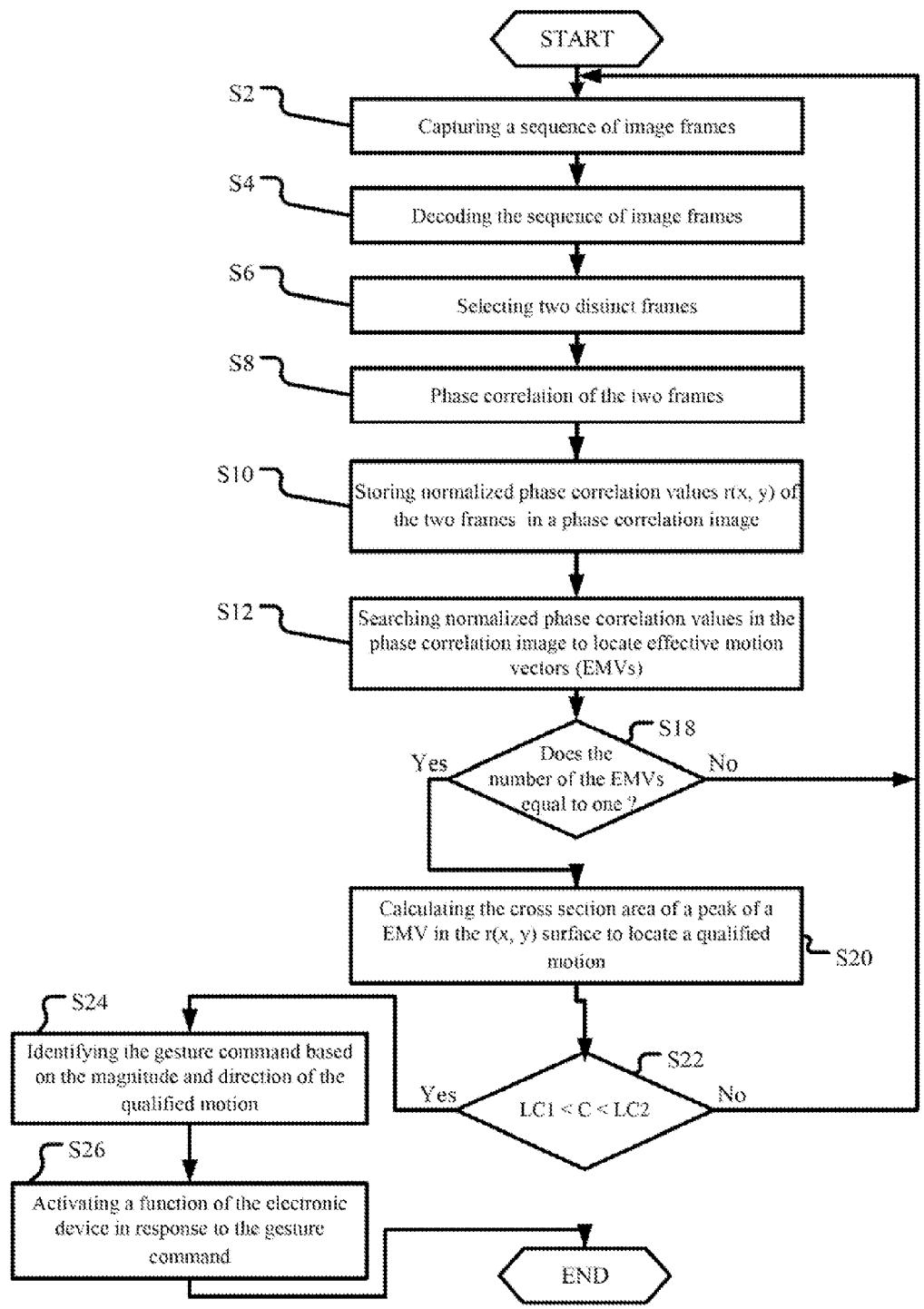
FIG. 2A is a flowchart of an exemplary embodiment of an operating method for a motion-controlled device.

With reference to FIG. 2A, the device 100 executes an operating method for a motion-controlled device. The image capture device 200 captures a sequence of video frames of a user (step S2), at, for example, thirty video frames per second, numbered as frame [1], frame [2], . . . and frame [30]. The encoder 204 encodes the sequence of video frames according to a video coding standard, such as H.264, VC-1, MPEG-2, or MPEG-4. The encoding executed by the encoder 204 may comprise data compression.

The device 100 receives and decodes the encoded sequence of video frames utilizing a decoder 166 and stores the decoded sequence of video frames in the main memory 152 (step S4). The decoder 166 may decode the sequence of video frames according to a video coding standard, such as H.264, VC-1, MPEG-2, or MPEG-4. The decoding executed by the decoder 166 may comprise data decompression The processor 151 selects two distinct frames from the sequence of video frames from the main memory 152, and passes the two selected frames to the DSP 165 (step S6). In step S6, for example, the processor 151 selects a frame [k] and a frame [k+n], where k and n are respectively positive integers and k+n does not exceed 30. For example, with reference to FIG. 3, image 331 representing frame [k] comprises objects 301 and 302 while objects 301' and 302' in image 332 representing frame [k+n] respectively represent the displaced objects 301 and 302. The objects 301 and 302, for example, may respectively comprise a hand and a face of the user.

The DSP 165 executes phase correlation on the two frames and normalizes the resulting phase correlation values (step S8). Exemplary the phase correlation methods, for example, may be referred to in U.S. Pat. Nos. 5,063,524, 5,808,626, and 7,885,483.

Figure 3:
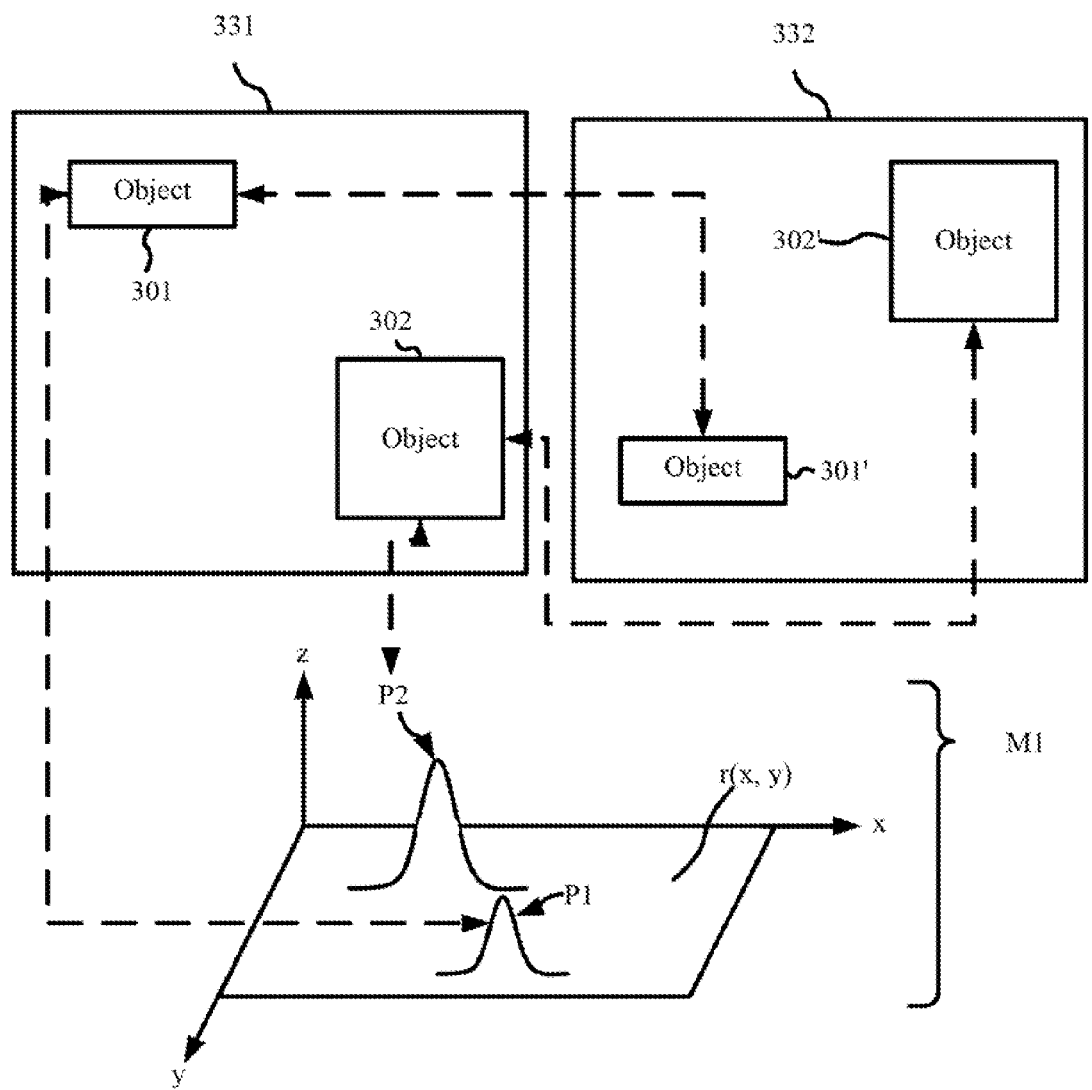
FIG. 3 is a schematic diagram of two exemplary video frames and a phase correlation image thereof.

The DSP 165 stores the normalized phase correlation values in a phase correlation image in the memory 152 (step S10). The normalized phase correlation values are represented as a function r(x, y) of variable x and y. The (x, y) represents a coordinate on the phase correlation image. The phase correlation image records the normalized phase correlation values r(x, y) in a two-dimensional coordination space, and is representative of a three-dimensional phase correlation surface in a three-dimensional coordination space spanned by axes x and y of the two-dimensional coordination space and an axis z representing scales of the normalized phase correlation values. For example, as shown in FIG. 3, the phase correlation image M1 can record the normalized phase correlation values of frame [k] and frame [k+n] in a two-dimensional coordination space. The normalized phase correlation values r(x, y) of the phase correlation image M1 represent a three-dimensional phase correlation surface with a peak P1 and a peak P2. The peak P1 is generated from phase correlation of the objects 301 and 301', and peak P2 is generated from phase correlation of the objects 302 and 302'.

Figure 2B:
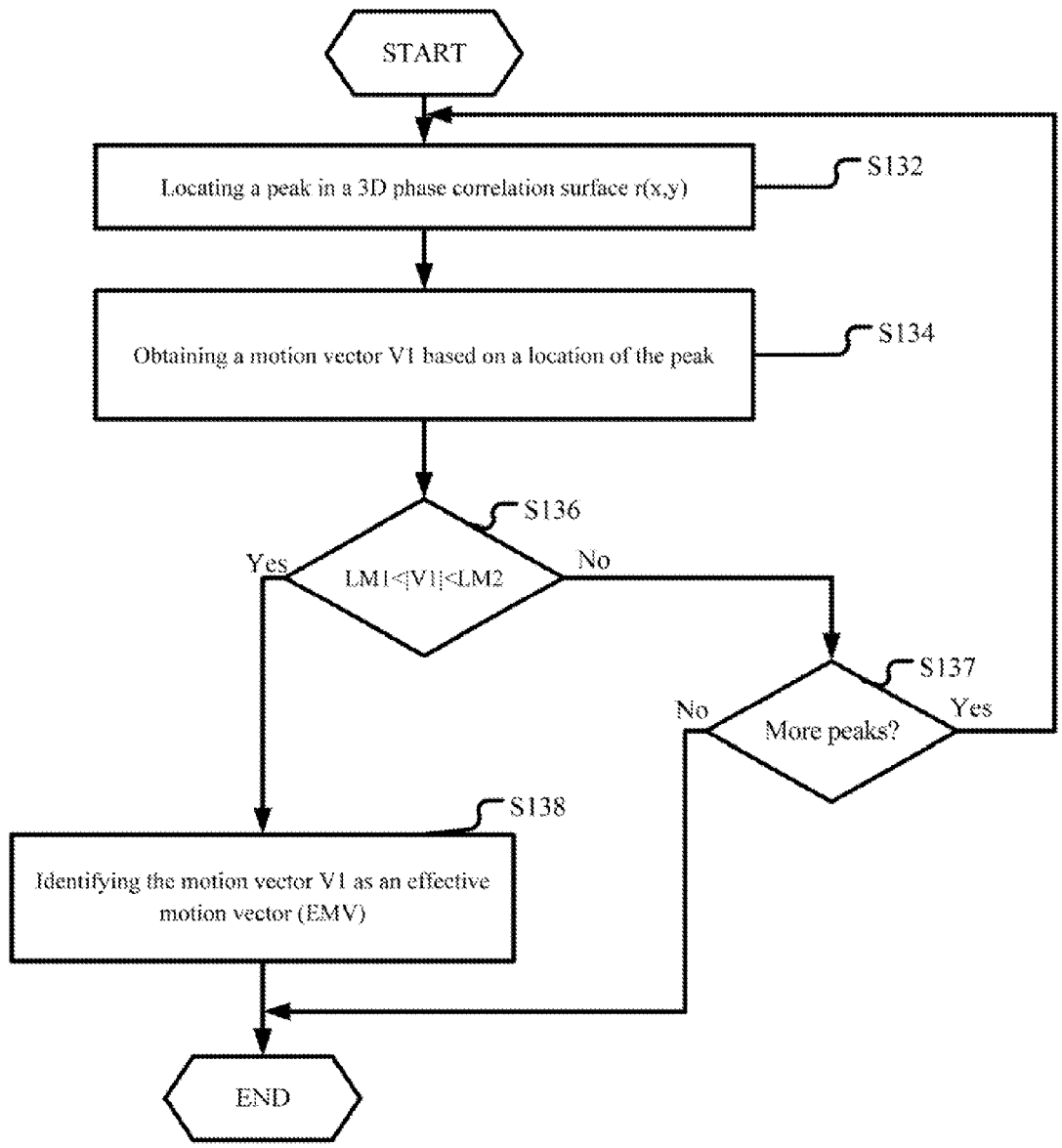
FIG. 2B is a flowchart of a significant motion detection process.

The DSP 165 searches normalized phase correlation values in the phase correlation image to locate effective motion vectors (EMVs), referred to as significant motions (step S12). With reference to FIG. 2B, step S12 further comprises steps S132-S138. The DSP 165 locates a peak of the three-dimensional phase correlation surface (step S132). For example, the DSP 165 can locate the peak by comparing the three-dimensional phase correlation surface against a threshold phase correlation value LB1. Specifically, the DSP 165 locates peaks exceeding the threshold phase correlation value LB1 in the three-dimensional phase correlation surface. For example, with reference to FIG. 4, the DSP 165 locates peaks P1 and P2 exceeding the threshold phase correlation value LB1.

Figure 4:
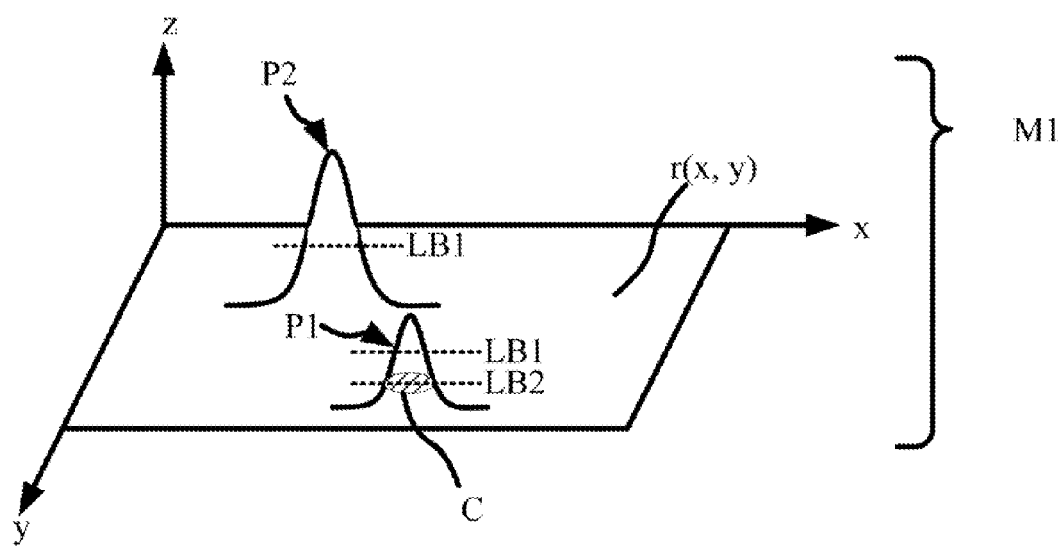
FIG. 4 is a schematic diagram showing different threshold phase correlation values in the phase correlation image in FIG. 3.
Figure 6:
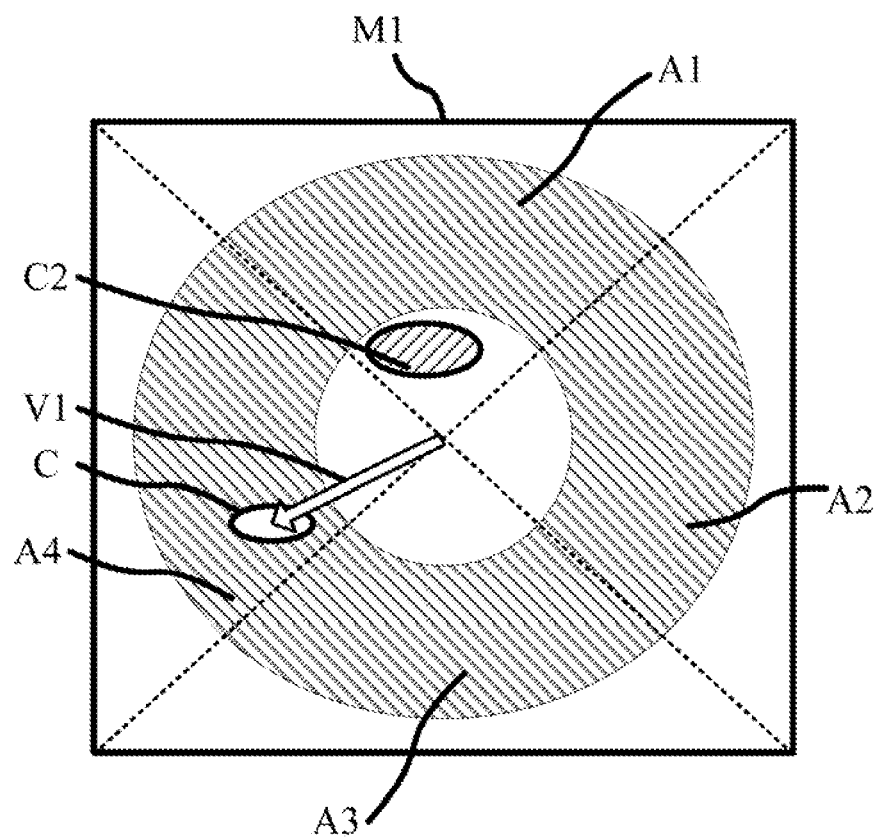
FIG. 6 is a schematic diagram showing range definition on the phase correlation image for motion recognition.

The DSP 165 obtains a motion based on a location of the peak (step S134). With reference to FIGS. 4 and 6, the DSP 165 obtains a motion vector V1 representing the motion in step S134 based on a location of the peak P1. The motion vector V1 travels from the center of the phase correlation image M1 to a location of the peak P1.

The DSP 165 identifies the magnitude of the motion vector V1 to determine if the motion vector V1 is a significant motion (step S136), that is, a candidate for further determination of possible qualification as generating a control motion. The control motion may comprise a gesture command recognizable by the device 100. The DSP 165 identifies the motion vector V1 as a significant motion if the magnitude of the motion vector V1 is in a range defined by a vector magnitude lower boundary LM1 and vector magnitude upper boundary LM2 (step S138). That is, the vector V1 is a significant motion only if:

$$LM1<|V1|<LM2 \quad (1)$$

If the magnitude of the motion vector V1 exceeds the range in formula (1), the DSP 165 determines that the motion vector V1 is not significant, and determines if another peak in the 3D phase correlation surface r(x, y) exceeds the phase correlation value LB1 (step S137). If an additional peak higher than the phase correlation value LB1 is identified in the 3D phase correlation surface r(x, y), step S12 is repeated therefor. Specifically, if more peaks are located in step S132, the DSP 165 similarly obtains motion vectors and significant motions from the located peaks in steps S134-S138.

The processor 151 determines the number of significant motions (step S18). If other than one, step S2 is repeated. If one, step S20 is implemented.

The DSP 165 calculates the cross section area of the peak from which the significant motion is obtained (step S20). For example, with reference to FIG. 4, if the motion vector V1 is determined as the significant motion, the DSP 165 calculates the cross section area C of the peak P1 targeted by the significant motion V1. The processor 151 identifies the significant motion as a qualified motion if the cross section area of the peak from which the significant motion is obtained is in a range defined by an area lower boundary LC1 and an area upper boundary LC2 (step S22). The processor 151 identifies that the significant motion is not a qualified motion if the cross section area of the peak from which the significant motion is obtained exceeds the range defined by an area lower boundary LC1 and an area upper boundary LC2. For example, the DSP 165 can initiate a function P(x, y) to calculate the cross section area of the peak P1. The function P(x, y) is defined as:

$$P(x,y)=1, \text{ if } r(x,y)>LB2, \text{ or else } P(x,y)=0.$$

LB2 is another threshold phase correlation value. The DSP 165 calculates the cross section area C of the peak P1 utilizing the formula:

$$C=\Sigma P(x,y) \qquad (2)$$

The cross section area C of the peak P1 in the phase correlation surface r(x, y) corresponds to an area of the object 301 in frame [k] and an area of the object 301' in frame [k+n]. The cross section area C of the peak P1 may be affected by adjustment of the lens 201 and a distance between the image capture device 200 and the objects 301 and 302. The processor 151 determines if the cross section area C is in a range defined by an area lower boundary LC1 and an area upper boundary LC2, which is to determine the veracity of the inequality:

$$LC1<C<LC2 \qquad (3)$$

Figure 5:
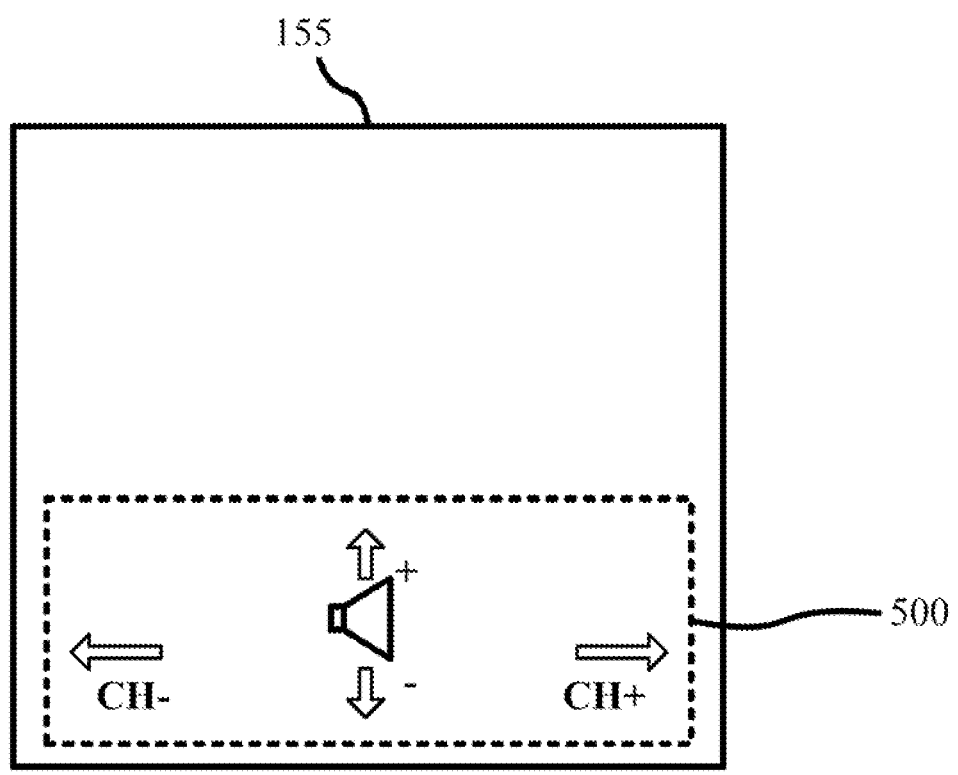
FIG. 5 is a schematic diagram showing exemplary control motions.

The qualified motion may comprise a control motion or a portion of the control motion. For example, a control motion may comprise only one qualified motion or a series thereof. The processor 151 identifies the control motion based on the magnitude and direction of the one qualified motion (step S24) and activates a function of the electronic device 100 in response to the identified control motion (step S26). For example, in FIG. 5, exemplary control motions are shown as onscreen display (OSD) 500 on the display 155. With reference to FIG. 6, the processor 151 may respectively increase or decrease output volume of the device 100 if the qualified motion targets from the center of phase correlation image M1 to a position on area A1 or A3. Additionally, the processor 151 may respectively change channel number of the device 100 if the qualified motion targets from the center of phase correlation image M1 to a position on area A2 or A4. Thus, the function of the device 100 is prevented from erroneous activation via identification of a representative area of the objects 301 and 301' in the phase correlation image M1. The representative area of the objects 301 and 301' in the phase correlation image M1 comprises a cross section area corresponding to the displaced object 301. The cross section area C of the peak P1 is a cross section area corresponding to a threshold phase correlation value LB2. The cross section area C2 of the peak P2 is out of the areas A1-A4, so that a motion targeting to a location of the peak P2 is not a significant motion.

The electronic device 100 obtains a motion of a displaced object in two captured video frames utilizing phase correlation of the two frames. The device identifies magnitude of the motion and an area in a phase correlation surface corresponding to an area of the object in the two frames to determine if the motion is a qualified motion. The electronic device 100 further utilizes the qualified motion to generate a control motion and activate a corresponding function of the device. The phase correlation surface is obtained from the phase correlation of the two frames.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An operating method for a motion-controlled device, executable by an electronic device comprising a processor and a memory, the operating method for the motion-controlled device comprising:
   receiving a sequence of video frames via an image capture device connected to the electronic device;
   selecting two distinct frames from the sequence of video frames by the processor;
   executing phase correlation on the two distinct frames by the processor;
   storing normalized phase correlation values of the two distinct frames as a result of the phase correlation in a phase correlation image in the memory, wherein the phase correlation image records the normalized phase correlation values in a two-dimensional coordination space and is representative of a three-dimensional phase correlation surface in a three-dimensional coordination space spanned by axes of the two-dimensional coordination space and an axis representing scales of the normalized phase correlation values;
   locating a peak of the three-dimensional phase correlation surface by the processor;
   obtaining a motion of an object in the two distinct frames based on a location of the peak by the processor, wherein the peak reflects the motion;
   identifying the motion as a qualified motion based on magnitude of the motion and a cross-sectional area of the peak by the processor; and
   activating a function of the electronic device in response to the qualified motion.

2. The method as claimed in claim 1, wherein the motion starts from a center of the phase correlation image to a location of the peak on the phase correlation image.

3. The method as claimed in claim 1, wherein the cross-sectional area of the peak is a cross-sectional area of the peak corresponding to a first threshold phase correlation value.

4. The method as claimed in claim 3, wherein the peak is located by comparing the three-dimensional phase correlation surface against a second threshold phase correlation value by the processor.

5. The method as claimed in claim 1, further comprising:
   identifying the motion as a significant motion by the processor if the magnitude of the motion is in a range defined by a vector magnitude lower boundary and a vector magnitude upper boundary, wherein the significant motion is a candidate of the qualified motion.

6. The method as claimed in claim 5, further comprising:
   identifying the significant motion as the qualified motion by the processor if the cross-sectional area of the peak is in a range defined by an area lower boundary and an area upper boundary.

7. The method as claimed in claim 1, wherein the cross-sectional area of the peak is a cross-sectional area of the peak corresponding to a first threshold phase correlation value while the peak is located by comparing the three-dimensional phase correlation surface against a second threshold phase correlation value by the processor, and the first threshold phase correlation value is less than the second threshold phase correlation value.

8. An electronic device comprising:
a memory operable to store a sequence of video frames captured by an image capture device connected to the electronic device; and
a processor electrically connected to the memory, and operable to execute an operating method for a motion-controlled device, wherein the method comprises:
selecting two distinct frames from the sequence of video frames, wherein both of the two distinct frames comprise a displaced object; and
activating a function of the electronic device in response to a motion of the displaced object, wherein the motion is obtained through phase correlation of the two distinct frames, and the function is prevented from erroneous activation utilizing identification of a representative area of the object in a phase correlation image recording the result of the phase correlation of the two distinct frames.

9. The electronic device as claimed in claim 8, wherein the phase correlation image records normalized phase correlation values of the two distinct frames in a two-dimensional coordination space and is representative of a three-dimensional phase correlation surface in a three-dimensional coordinate space spanned by axes of the two-dimensional coordination space and an axis representing scales of the normalized phase correlation values, and the representative area of the object in the phase correlation image comprises a cross-sectional area of a peak in the three-dimensional phase correlation surface corresponding to the displaced object.

10. The device as claimed in claim 9, wherein the cross-sectional area of the peak is a cross-sectional area of the peak corresponding to a first threshold phase correlation value while the peak is located by comparing the three-dimensional phase correlation surface against a second threshold phase correlation value by the processor, and the first threshold phase correlation value is less than the second threshold phase correlation value.

11. An electronic device comprising:
a memory operable to store a sequence of compressed video frames captured by an image capture device connected to the electronic device; and
a processor electrically connected to the memory, and operable to execute an operating method for a motion-controlled device, wherein the method comprises:
decompressing the sequence of compressed video frames;
selecting two distinct frames from the sequence of decompressed video frames;
obtaining a motion of a displaced object in the two distinct frames utilizing phase correlation of the two distinct frames;
identifying the motion as a qualified motion based on magnitude of the motion and an area in a phase correlation surface corresponding to an area of the object, wherein the phase correlation surface is generated from the phase correlation of the two distinct frames; and
activating a function of the electronic device in response to the qualified motion.

12. The device as claimed in claim 11, wherein the area in the phase correlation surface corresponding to an area of the object is a cross-sectional area of a peak in the phase correlation surface corresponding to a first threshold phase correlation value, and the peak reflects the motion of the displaced object.

13. The device as claimed in claim 12, wherein the peak is located by comparing the three-dimensional phase correlation surface against a second threshold phase correlation value by the processor, and the first threshold phase correlation value is less than the second threshold phase correlation value.

* * * * *